Jan. 22, 1952  G. H. FRITZINGER  2,582,979
DEVICE FOR USING TAPE
Filed July 24, 1948  2 SHEETS—SHEET 1
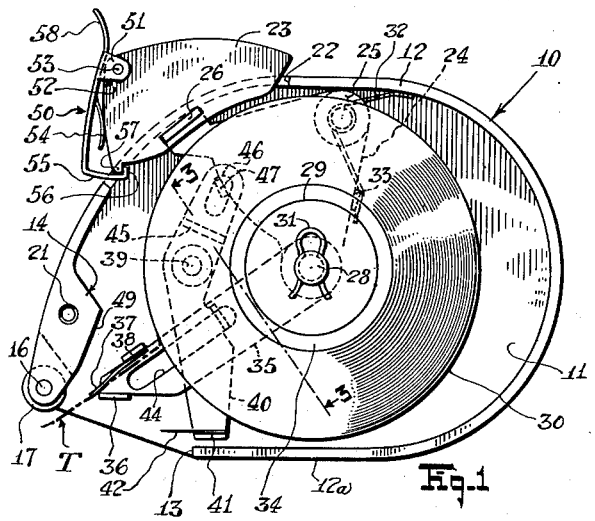
INVENTOR.
George H. Fritzinger Jan. 22, 1952
G. H. FRITZINGER
2,582,979
DEVICE FOR USING TAPE
Filed July 24, 1948
2 SHEETS—SHEET 2
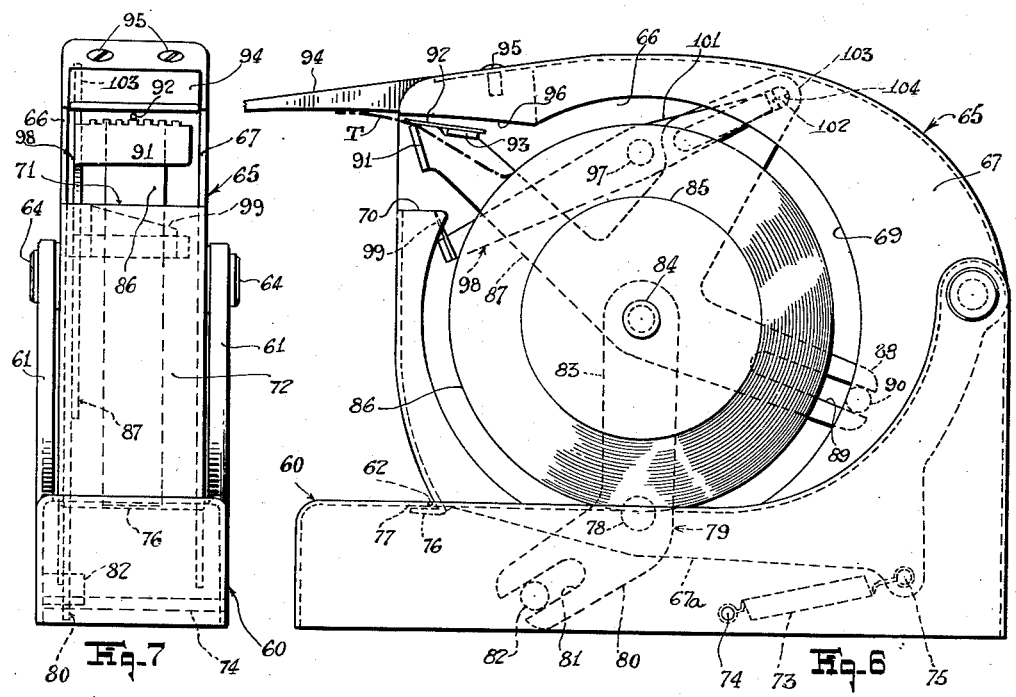
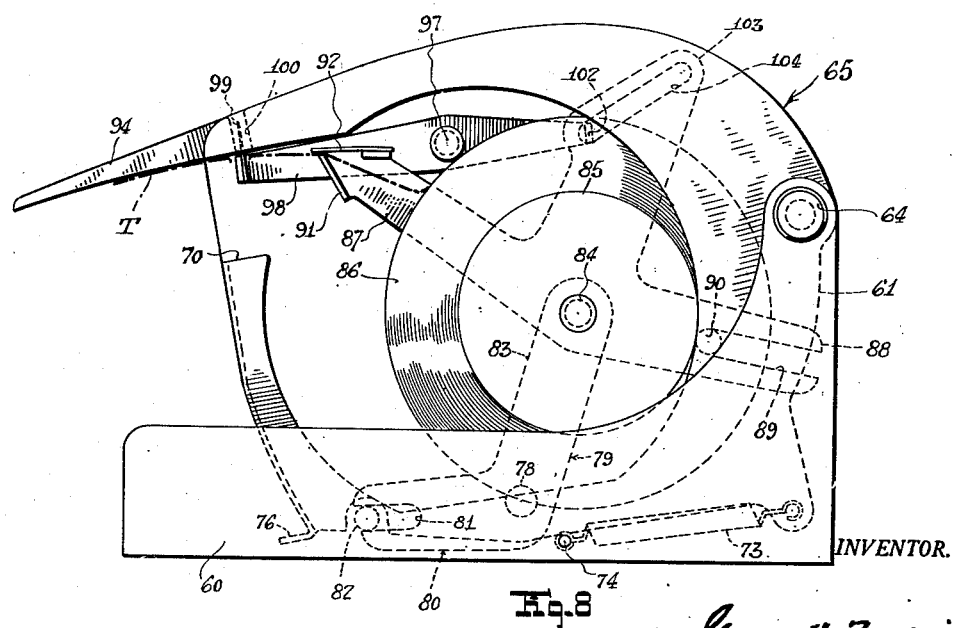
INVENTOR.
George H. Fritzinger Patented Jan. 22, 1952

2,582,979

UNITED STATES PATENT OFFICE 2,582,979

DEVICE FOR USING TAPE

George H. Fritzinger, West Orange, N. J., assignor of one-half to Harold G. Kendall, Brooklyn, N. Y.

Application July 24, 1948, Serial No. 40,548

18 Claims. (Cl. 216—29)

This invention relates especially to devices for dispensing and applying pressure-sensitive adhesive tape. By way of illustration the invention is herein particularly described in terms of devices adapted for both dispensing and applying such tape in one operation—such devices being herein referred to as taping devices—and also in terms of a device for dispensing such tape which is of the type wherein the dispensed lengths are picked up by hand and applied by the operator.

In the pending application Serial No. 616,785 of Harold G. Kendall, filed September 17, 1945, (now Pat. No. 2,511,856) and having common ownership with the present application, and in the pending application of the present inventor, Serial No. 765,139, filed July 31, 1947, (now Pat. No. 2,511,857), there are disclosed different taping devices which embody the novel principle, in the art of dispensing pressure-sensitive tape, of drawing tape from the supply roll as an incident precedent of cutting the tape, so as to make available a starting length for a succeeding taping operation at the completion of each such operation. Typically, this principle is carried out as follows: a tape guide member is normally positioned so that it holds a projecting end portion (starting length) of the tape at a dispensing station. When it is desired to sever a dispensed length of the tape from the tape supply, the tape is held against backfeeding at the dispensing station and, simultaneously, the guide member is retracted therefrom. As the guide member is retracted a fixed length of tape is maintained between it and the supply roll to cause tape to be drawn from the latter. As the guide member is moved through the final portion of its retracting movement, the tape is severed at the dispensing station to leave a starting length projecting ahead of the guide. When the guide is returned this starting length is moved to the dispensing station for a succeeding dispensing operation. Thus, although pressure-sensitive tape usually requires considerable force to pull it from the supply roll, by the present principle a starting length for a succeeding operation is positively drawn from the supply roll as an incident of severing each dispensed length from the tape supply and, moreover, by this principle the device need have only one manually actuatable control member.

A general object of the present invention is to provide new and improved taping and dispensing devices incorporating this principle.

Another object is to provide a novel device of the character described, which is adapted to serve selectively either as a dispenser, taping device or device for spotting short lengths of tape at selected points; and a further object is to provide such a device which is light and compact to enable it to be conveniently carried and be easily manipulated by the hand.

Other objects are to provide novel and improved mechanisms for carrying out the aforestated principle which are simpler and more economical to produce and which require less actuating force than those heretofore known, and which are adapted for easily cutting heavy, tough, pressure-sensitive tapes cleanly on a straight line.

Still other objects and features of my invention will be apparent from the following description and the appended claims.

In the description of my invention, reference is had to the accompanying drawings, of which:

Figure 1 is a side elevational view of a taping device according to my invention, showing the device with the side cover removed and in an unactuated condition;

Figure 2 is a front elevational view of this device;

Figure 3 is a fractional sectional view taken substantially on the line 3—3 of Figure 1;

Figure 4 is a view similar to that of Figure 1 but showing the device in an actuated condition;

Figure 5 is a side elevational view, similar to Figure 1, showing a modified form of taping device;

Figure 6 is a side elevational view of a dispenser according to my invention, showing the dispenser in an unactuated condition;

Figure 7 is a front elevation of this dispenser; and

Figure 8 is a side elevational view similar to that of Figure 6 but showing the dispenser in an actuated condition.

The taping device shown in Figures 1–4 comprises a housing 10 which may be cast or drawn of metal, or molded of plastic, a plastic housing being shown in the drawings by way of illustration. The housing comprises a flat side wall 11 having a contour as shown in Figure 1, which is provided with an integral transverse wall 12 along its entire edge except at the lower forward part of the housing whereat the wall is omitted to provide the housing with an exit opening 13 for the tape to be dispensed. Integral with the forward wall of the housing is an internal block 14, extending through the full width of the housing, and projecting forwardly and downwardly from this block are left and right apertured ears 15 and 15a. These ears carry a cross pin 16 on which there is journalled a pressure roller 17 for applying the tape to an object as the device is moved thereacross. The bottom part of the wall 12 is flat to provide a seat 12a for the device so that it may be set firmly in an upright position (Figure 1) as on a table or desk when the device is not in use. When the device is so set upright, the pressure roller 17 is at a distance above the table as is also the starting length of tape T which is projected through the opening 13 as will be apparent.

The housing 10 has a removable side cover 18 at its right side (Figure 2). This cover comprises a flat plate having the same contour as has the side wall 11. The side cover is provided with a flange 19 which is adapted to fit snugly with the the wall 12 to hold the cover detachably in place. Additionally, the cover may have a locating pin 20 for engaging snugly a hole 21 in the block 14. To detach the cover a finger is inserted in the opening 13 and the cover is drawn off sidewise.

In the forward upper portion of the wall 12 there is a rectangular clearance opening 22 for a push button 23 which is for manually actuating the device to sever the dispensed tape from the tape supply. This push button is carried by a lever 24 that is pivoted to the upper central part of the left side wall 11 on a pivot stud 25. The button is mounted on a transverse lug 26 of the lever 24 and is retained thereon by the abutment of the button against the side edges of the opening 22. Staked to the lever 24 at approximately the center of the device is a transverse stud 28, and journalled on this stud is a core 29 for a supply roll 30 of pressure-sensitive tape. The core is retained in place by a spring clip 31 at the outer end of the stud. By way of typical example the housing 10 is made large enough to receive a standard 1296 inch roll of the tape, which is a roll having approximately a diameter of 2⅝ inches.

The lever 24 is urged forwardly, into a position defined by the abutment of the leg 26 against the wall 12, by a torsion spring 32 which surrounds the stud 25 and has one leg bearing against the wall 12 and the other against a lug 33 struck from the lever 24. This lug 33 also serves as a stop against which the annular core part 34 of the supply roll may abut to define the innermost position of the supply roll on the core 29.

The movably mounted supporting means for the supply roll, above described, constitutes part of a mechanism for feeding a starting length of tape T through the opening 13 in juxtaposition with the pressure roller 17 upon release of the push button 23. Also included in this mechanism is a bar 35 pivoted at its inner end to the stud 28. This bar extends forwardly and downwardly nearly to the opening 13 and has at its forward end a transverse tape guide and feed lug 36. Lightly engaging the forward edge of this lug is a light cantilever spring 37, preferably of piano wire, which is anchored to a lug 38 of the bar 35. The tape is drawn from the supply roll between the guide lug 36 and spring 37 with the adhesive side of the tape facing downwardly and adhesively engaging the forward edge of the lug under pressure of the spring 37. When the device is in an unactuated state the spring 32 holds the supply roll and guide 35—36 forwardly in an initial or normal position wherein the guide projects the starting length of tape T below the pressure roller 17 for application to an object to be taped when the pressure roller is pressed thereagainst.

Pivoted to the left side wall 11 of the housing on a pivot stud 39 is a lever 40 having a transverse leg 41 on its lower end on which there is mounted a blade 42. This lever lies between the guide 35—36 and the side wall 11, and is carried jointly by the guide 35—36 and the lever 24 as before described. The coupling between the lever 40 and guide comprises a lug 43 turned over from the lever which slidably engages a slot 44 in the guide. On the lug 43 there is a retaining ear 43a to hold the guide thereon (Figure 3).

The lever 40 has an upwardly extending arm offset at 45 so that the end portion thereof overlies the lever 24. In this end portion of the arm there is a slot 46 which is engaged slidably by a lug 47 of the lever 24. It is by this coupling of the lever 40 to the lever 24 that the cutting blade is actuated as the push button 23 is depressed, as will herein be apparent. When the taping device is in its normal unactuated state, the blade 42 is held in the retracted position its occupies in Figure 1.

Upon depressing the push button 23, the parts are moved into the positions they occupy in Figure 4. For instance, the lever 24 is turned to move the supply roll 30 to the rear of the housing and to retract the guide lug 36 from the pressure roller 17 and opening 13, with the guide lug being maintained at a fixed distance from the axis of the supply roll so as to maintain a fixed length of free tape between it and the roll. Also, as the guide and supply roll are so retracted the lever 40 is swung forwardly to cause the blade 42 to engage the adhesive side of the tape ahead of the guide and to enter a narrow slot between the pressure roller and block 14 to cut the tape. The slidable coupling 43—44 of the guide to the lever 40 serves to turn the guide as it is retracted so as to direct the guide lug 35 substantially on the radius line of the pivot axis of the blade 42 and thus hold the tape substantially at right angles to the blade while the tape is cut. This reduces the adhesive engagement of the tape with the blade substantially to a line contact and prevents the forward end portion of the tape supply from sticking to the blade as the tape is cut. However, the forward edge of the tape supply will contact the blade and cause the tape projecting ahead of the guide lug 35 to be deflected backwardly as the guide is returned to initial position. This backward deflecting of the tape is beneficial in that it prevents the starting length of tape from possibly adhesively contacting the pressure roller 17 and from being coiled back on itself when the push button is released and also in that it prevents adherence of the end of the tape supply to the object just taped should the operator release the push button 23 before lifting the device from the object.

The cutting edge 42a of the blade is either pointed or inclined, an inclining being shown by way of illustration in Figure 3, and may additionally be serrated so as to facilitate the cutting of the tape. By having the blade enter a slot provided between the pressure roller 17 and block 14, the tape is cut as near as possible to the pressure roller and the mechanism is simplified since no special slot has to be provided in the block.

The inner face 49 of the block 14 serves as a stationary guide for the starting length of tape T projecting ahead of the guide lug 36 as the guide 35—36 is returned to its initial position. This face is inclined slightly away from the pressure roller so that as the non-adhesive side of the tape T slides against the surface 49 during the return of the guide, the tape will clear the pressure roller so as not to adhere thereto and be curled back on itself. However, as the tape is moved off the face 49, it naturally turns upwardly to lie closely adjacent to the underside of the pressure roller.

The initial position of the guide 35—36 is such that as the tape is drawn from the supply roll across the pressure roller 17, the tape will clear the guide lug 36 and have no drag imposed thereon by sliding contact of any part of the device with its adhesive side. Although the spring 37 lightly bears against the non-adhesive side of the tape, it has only a line contact therewith and imposes no drag resistance on the tape. The avoidance of any drag resistance on the tape is particularly important in dispensing and applying the pressure-sensitive tapes because each of these tapes requires typically considerable force to pull it from a supply roll thereof.

Although the pressure-sensitive tapes pull quite hard from the supply rolls thereof, in the present device the return spring 32 for the operating mechanism of the taping device may be quite light since the work required to pull the starting length of tape for a succeeding application is performed positively by the operator as he presses the push button 23 to cut the tape, and when once cut the mechanism will return easily to unactuated position since it need not then perform any work.

To use the present taping device, the operator may hold the housing in his hand with his forefinger overlying the push button 23, and then tilt the device forwardly to bring the pressure roller against an object O to be taped (Figure 4), thus adhesively engaging the starting length of tape T with the object. Next, he may move the device across the object while maintaining the pressure roller in engagement therewith whereby to draw tape from the supply roll and press it against the object. When the desired length has been applied, the operator will press the push button, while continuing either to move the device forwardly or while holding it stationary, to cut the tape. The reason for not permitting the device to back feed as the tape is cut is for preventing the tape already applied from being pulled from the object and for holding the tape taut to facilitate the cutting of the tape.

An alternative method of using the present taping device, which is particularly adapted for taping thin sheets in that it enables the tape to be applied without being in a stretched condition to cause curling of the sheet, is to first set the device on the object to adhere the starting length T thereto and then, while holding the starting length on the sheet by one hand, to pull the device away with the other hand, without contacting the object by the pressure roller. After thus drawing off the desired length of tape the pressure roller is set onto the object and a finger of the first hand is slid across the tape to apply it to the object. Next, while holding the device stationary, the push button is depressed to sever the applied length of tape from the tape supply. Preferably, when the device is used in this manner the pressure roller 17 is omitted to provide a space between the ears or lugs 15 and 15a in which the forefinger of the hand may be placed to affix the starting length to an object to be taped when the device is set down on the lugs 15 and 15a. Also, the lugs then serve as feet to space the opening 13 from the object so that when the device is slid across the object on these lugs the tape is drawn from the housing across the object without being applied directly to the latter.

To facilitate the use of the device for applying long lengths of tape provision is made whereby the operator may use the push button as a finger rest to enable easier handling of the device. For this purpose the push button is provided with a releasable latch 50 for locking the push button in its unactuated position. This latch is a stamped piece having two apertured ears 51 disposed in side recesses 52 of the push button and pivoted to the button on a cross pin 53. Struck from the latch is a central spring 54 which bears against the forward wall of the push button to urge the latch forwardly into its effective position. In this position of the latch a lower nearly horizontal dwell 55 thereof overlies the forward edge of the opening 22 to lock the push button. This effective position of the latch is defined by abutment of a lug 56, turned up from the rear end of the dwell 55, against a depending shoulder 57 on the push button. Projecting upwardly above the push button is a fingerpiece 58 of the latch. When the operator desires to actuate the push button to cut the tape, he need only slide his forefinger forwardly against the fingerpiece to release the dwell 55 from the edge of the opening 22a and then press downwardly on the push button.

The present device is a universal one having many different uses and modes of operation. It is, for instance, not only a taping device as above described but also a dispenser and a tape spotter. As a dispenser, the operator may hold the device in one hand while he grips the starting length with the other hand and draws out the desired length of tape; thereupon while holding the tape slightly taut he presses the push button 23 to cut the tape, leaving thus a dispensed length of tape in the hand to be applied manually. Alternatively, still as a dispenser, the device may be let lie on its side and while gripping the device in one hand the desired length of tape may be drawn out with the other hand and then the button 23 may be depressed to cut the tape, all while the device is left lying as on a desk or table. As a tape spotter, the operator will press the pressure roller against the object to adhere the starting length thereto and then press the push button to cut the tape. In so doing short lengths of the order of ⅜ inch can be spotted accurately at desired points.

In Figure 5 there is shown a modified form of the taping device above described. This taping device has many parts identical with corresponding parts of the foregoing embodiment and which are given the same reference characters. Modified parts are given the reference number of the corresponding parts of the foregoing embodiment with the suffix letter $m$, and new parts are given new reference characters.

This second embodiment differs particularly from the foregoing particularly in the mounting and mode of operation of the actuating means of the device. Here, the device has a push bar 105 provided with a fingerpiece 105a at its forward end which is adapted to fit the end of the forefinger. The push bar is pivoted at its rear end to the stud 28 between the guide bar 35 and the core 29 on which the supply roll is mounted. The outer end portion of the push bar passes slidably through a clearance slot 107 in the forward wall of the housing. In this embodiment, a lever 24m, corresponding to the lever 24, is simply a bar pivoted at one end to the stud 25 and has the stud 28 staked to its other end. The lever 24m is urged forwardly by the torsion spring 32 against a boss 108 on the side wall 11, the spring 32 being hooked at one end to a lug 109 of the lever 24m and bearing against the wall 12 at its other end. When the lever 24m is in this forward position the push bar is in its forward unactuated position shown in Figure 5.

A lever 40m, corresponding to the foregoing lever 40, is in this embodiment operated directly by the push bar 105, the coupling between the two comprising a lub 110 turned over from the upper end of the lever and a slot 111 in the push bar engaged by this lug. When the push bar is depressed the supply roll and guide 35—36 are moved rearwardly and the lever 40m is turned to cause the blade 42 to cut the tape, the same as in the foregoing embodiment. In this embodiment, however, the direction of movement of the push bar is in a rearward direction nearly parallel with the surface being taped. This enables the fingerpiece 105a to be used as a brace for pressing the pressure roller against the object being taped, which is very advantageous in that it enables the operator to hold the device firmly with a light grip of the hand. Also the direction of actuation of the push bar is in the natural direction of movement of the tip of the forefinger while the device is being held in the hand. This enables the operator to exert a greater force on the push bar with less effort than were the push bar otherwise directed.

As is described in my pending application Serial No. 765,139, now Pat. No. 2,511,857 aforementioned, the push bar 105 may be provided with a notch 112 in the upper edge of its forward end portion by which, when the push bar is depressed, it may be raised to hook onto the wall 12 at the upper edge of the slot 107 to latch the mechanism in its actuated state. This is advantageous for holding the push bar in an inner position and for retaining the starting length of tape T retracted in a protected position within the housing as when the device is set aside or being carried in a pocket, handbag, or the like.

In each of the foregoing embodiments a mechanism is provided for cutting the tape and supplying a succeeding starting length of tape, which has the greatest ease of operation, for no drag resistance is put on the tape while it is being redrawn from the device and the only drag resistance imposed during a cutting operation is the sliding contact of the forward edge of the guide lug 36 against the tape. (Incidentally, even this drag resistance could be avoided were the supply roll retracted in the same direction as is the guide lug 36, but this is undesirable in a hand applier since it would require the device to have a shape that would make it inconvenient to use.) In order to reduce even the drag resistance on the tape during the cutting thereof the forward edge of the guide lug 36 is notched or serrated at 36a as shown in Figure 3.

In Figures 6, 7 and 8 there is shown a dispenser incorporating the principle of operation of the foregoing taping devices, which is of a type adapted for removal of the dispensed lengths of tape from the machine by the hand of the operator. This dispenser comprises a hollow base 60 having two side standards 61 at the rear end thereof. The base is closed at all sides except that it has a long rectangular opening 62 in the top wall thereof between the standards 61 and extending forwardly throughout the major part of the length thereof. The standards 61 carry bearing studs 64 at their upper ends on which the rearward end of a frame or housing 65 is pivoted. This housing is rectangular as viewed from the top and has a contour viewed from the side as shown in Figure 6. The lower portion of the housing extends into the opening 62 to the line 67a and is at all sides at a clearance distance from the edges of this opening.

The left wall 66 of the housing is solid and carries the operating mechanism of the machine as will be apparent. The right wall 67 forms a partial closure for this mechanism, there being in this wall a large circular opening 69 leading forwardly at 70 to communicate with an opening 71 in the upper part of the front wall 72 of the housing. These side walls have apertures receiving the pivot studs 64 abovementioned. The housing is urged upwardly by a tension spring 73 connected between a pin 74 on the base 60 and an ear 75 on a side wall of the housing. The uppermost position of the housing is defined by the abutment of a stop lug 76 on the lower end of the front wall 72 against the under side of the top wall of the base 60, at 77, as shown in Figure 6.

Pivoted at 78 to the left wall 66 is a bell crank lever 79. This lever has an arm 80 extending forwardly and downwardly into the base 60 and provided with a slot 81 which is engaged slidably by a stud 82 mounted on the left wall of the base. This lever has an upright arm 83 which carries a stud 84 on which there is journalled a core 85 for a supply roll 86 of pressure-sensitive tape. In the normal unactuated position of the housing shown in Figure 6, the supply roll is in a forward part thereof. As the housing is rocked downwardly about the pivot studs 64 the lever 79 is turned on the pivot 78 to move the supply roll rearwardly into the position it occupies in Figure 8.

Pivoted also on the stud 84 is a feed and guide lever 87 having a rearwardly extending arm 88 provided with a long slot 89 which is engaged slidably by a guide pin 90 on the wall 66. This guide lever extends forwardly nearly to the opening 71 whereat it has a transverse guide lug 91. It is across the top edge of this guide lug that the tape is drawn from the supply roll and out through the opening 71 with the adhesive side thereof facing downwardly, the tape being retained in adhesive contact with this lug by a light cantilever spring 92 at its non-adhesive side which is anchored to the guide lever at 93. As the housing is moved downwardly the guide lever is moved rearwardly with the supply roll into the position it occupies in Figure 8.

Above the guide lug 91 there is a forwardly projecting fingerpiece 94 secured by screws 95 to the top wall of the housing. This fingerpiece has a smooth bottom surface 96 for backing the non-adhesive side of the tape T which projects ahead of the guide lug 91, this length T being analogous to the starting length of the taping devices. Preferably this fingerpiece is made of transparent plastic material so that the operator may see the positioning of the starting length. By this fingerpiece the tape is gripped thereagainst and held thereto while the fingerpiece is depressed to rock the housing downwardly to retract the supply roll and guide, and to cut the tape as is herein next described.

Pivoted at 97 to the side wall 66 is a lever 98 which lies between the guide lever and this side wall. This lever has a transverse lug at its forward end on which there is mounted a cutting blade 99. This blade engages a slot 100 in the fingerpiece to cut the trape from the adhesive side thereof as the blade is swung upwardly (Figure 8). In order that the blade will be so actuated as the housing is depressed, it is coupled to the guide lever. This coupling comprises a rearwardly extending arm 101 on the blade lever provided with a lug 102 at the end thereof, and an arm 103 on the guide lever which has a slot 104 engaged slidably by this lug. By this coupling the blade is held in a downward position when the housing is in its normal unactuated position (Figure 6) and is moved upwardly into the slot 100 to cut the tape as the housing is depressed (Figure 8).

From the foregoing description it is apparent that when the dispenser is in its unactuated condition the starting length of tape T projects through the opening 71 along the bottom face of the fingerpiece 94. To sever this length from the tape supply the operator will grip the fingerpiece and clamp the tape thereto, engaging the adhesive side of the tape with his forefinger, and press the housing downwardly. As the housing is so depressed, the supply roll and guide are moved rearwardly to draw tape from the roll and the blade is actuated to cut the length of tape in the hand from the tape supply, this cutting being at a distance ahead of the guide while the latter is in a retracted position. When the hand is removed from the fingerpiece, the tape length just cut from the tape supply is carried away by adhesive contact with the forefinger for ready manual application to an object. Also, as the hand is removed from the fingerpiece, the housing is returned upwardly to project a succeeding starting length through the opening 71 for a successive dispensing operation.

If the operator should want a length of tape longer than the starting length abovedescribed, he will first bring his forefinger in adhesive engagement with the starting tape T and pull forwardly to draw out the desired length, and then depress the fingerpiece to sever it from the tape supply. For this purpose the fingerpiece is made quite long as shown.

The opening 69 in the right side wall 67 is provided to give access for the mounting of the supply roll and may be left open since the housing provides ample protection and sufficient enclosure thereof.

The embodiments herein above described are intended to be illustrative and not necessarily limitative of the present invention since various changes and modifications may be made therein without departing from the spirit of my invention, which I endeavor to set forth according to the following claims.

I claim:

1. In a device for dispensing lengths of pressure-sensitive tape, including a frame: the combination of a movably mounted support on said frame for a supply roll of said tape; a tape guide having a normal position wherein the same holds a leading end portion of the tape at a dispensing station, means connecting said guide to said support to maintain it at a fixed distance from the axis of said supply roll; means for severing the tape at said station; and manually actuatable means for retracting said guide and support from said station and for causing said tape to be cut ahead of said guide by said severing means while the guide is in a retracted position.

2. In a device for dispensing lengths of pressure-sensitive tape from a supply roll: the combination of a support for said supply roll; a guide for holding a leading end portion of the tape at a dispensing station; means pivotally connecting said guide to said support at the axis of said supply roll to maintain the guide effectively at a fixed distance from the supply roll during a dispensing operation, said guide mounted for movement towards and away from said dispensing station; means for severing the tape at said station; and actuatable depressible means coupled to said guide and severing means for retracting said guide from said station and for concurrently operating said severing means to cut the tape ahead of the guide when the latter is in a retracted position.

3. In a device for dispensing lengths of pressure-sensitive tape from a supply roll: the combination of a guide having a normal position wherein it holds a leading end portion of the tape drawn from said roll at a dispensing station, said guide being mounted for reciprocative movement from and towards said station; means for severing the tape at said station; a movably mounted support for said roll; means pivotally connecting said guide to said support at the axis of said roll to maintain the guide at a fixed distance from the supply roll during each reciprocation of the guide; spring means urging said guide into said normal position; and actuatable means coupled to said guide and severing means for moving said guide a distance from said station and for thereupon severing the tape at said station ahead of said guide.

4. A taping device including a support for a supply roll of tape; an applier for pressing the tape drawn from said roll onto an object as the device is moved thereacross; a member positioned adjacent to said applier at one side of the tape drawn from said roll, said member having an edge spaced from said applier to form a slot therebetween; and a cutting blade movably mounted on said device for engaging said slot to sever the tape.

5. A taping device comprising a housing having an exit opening for adhesive tape; a support in said housing for a supply roll of said tape; means in said housing for projecting a leading end portion of the tape supply through said opening to serve as a starting length; and an applier on said housing at one end of said opening for pressing the tape drawn from said roll onto an object as the device is moved thereacross, said housing having a bottom seat arranged so that when said device is set at rest on an object said applier and starting length are thereabove by a clearance distance.

6. A taping device comprising a housing having an exit opening for the tape to be dispensed; a support in said housing for a supply roll of said tape; a guide for holding a leading end portion of the tape at said opening; a blade movably mounted on said housing for severing the tape at said opening; a push member projecting from said housing means coupling said push member to said guide and said blade for retracting said guide from said opening and for concurrently actuating said blade to sever the tape ahead of said guide as said push member is depressed; and a coupling between said blade and said guide for directing the latter in a path which is substantially at right angles to said blade as the tape is cut.

7. In a device for dispensing lengths of tape from a supply roll, including a frame: the combination of a movably mounted support on said frame for said supply roll; a tape guide having a normal position wherein it holds a leading end portion of the tape at a dispensing station, means pivotally connecting said guide to said support to maintain it at a fixed distance from the axis of said supply roll; a tape-severing blade; a lever pivoted on said frame and carrying said blade, said lever being actuatable to sever the tape at said station; means for retracting said guide and support from said station and for concurrently actuating said lever to sever the tape ahead of the guide; and means coupling said guide to said lever for pivoting the guide relative to said support as the guide and support are retracted to cause the path of the guide to be substantially radial to the pivot axis of said lever.

8. In a taping device including a frame and a support on said frame for a supply roll of tape: the combination of an applier on said frame for pressing the tape onto an object as the device is moved thereacross; means for feeding a projecting length of said tape past said applier into a starting position adjacent thereto with the adhesive side of the tape facing away from the applier; and a member on said frame having a stationary guide surface for slidably contacting the non-adhesive side of the projecting length as the same is fed into said starting position, said guide surface being positioned relative to said applier to direct the forward end of the tape at a clearance distance from the applier as the tape is fed into said position.

9. A taping device comprising a housing adapted to be held by the hand and having an exit opening for the tape to be dispensed; a support for a supply roll of said tape pivoted to said housing for movement towards and from said opening; a guide pivoted to said support at the axis of said roll; said guide having a normal position wherein it projects a leading end portion of the tape through said opening; a push member pivotally connected to said support and projecting slidably from the upper forward portion of said housing, said push member being actuatable to move said guide and roll away from said opening; a blade; a lever pivoted to said housing and carrying said blade, said lever being operated by said push member for severing the tape at said opening; and a slidable connection of said guide to said lever for directing the guide in a path substantially radial to the pivot axis of the lever.

10. A taping device for dispensing and applying selected lengths of pressure-sensitive tape from a supply roll to objects, comprising a housing adapted to be held in the hand and having an exit opening for the tape at the lower forward portion thereof; a pressure roller on said housing for pressing the tape onto an object as the device is moved thereacross; means on said housing extending inwardly from said pressure roller for backing the non-adhesive side of the tape, said means cooperating with said roller to form a narrow slot therebetween throughout the width of the tape; a guide urged into an initial position wherein it holds a projecting end portion of the tape supply in juxtaposition with said pressure roller to serve as a starting length, said guide being mounted for retracting movement from said pressure roller; a mounting core for said supply roll; means pivtally connecting said guide to said core at the axis of the latter; a pivoted blade at the adhesive side of the tape drawn from said roll for engaging said slot to sever dispensed lengths of tape from the tape supply; means operatively coupling said blade to said guide to cause the blade to engage said slot as the guide is retracted and to be moved clear from the end of the tape supply as said guide is returned; and a fingerpiece projecting from said housing and coupled to said guide to retract the guide as the fingerpiece is depressed.

11. A tape dispenser comprising a base; a frame movably mounted on said base; a support on said frame for a supply roll of tape; means movably mounted on said frame for feeding a leading end portion of the tape supply into a dispensing position as the feeding means is moved relative to said frame; and coupling means between said feeding means and said base effective upon movement of said frame relative to said base for operating said feeding means.

12. A tape dispenser comprising a base; a frame pivoted to said base for up and down movement; a support on said frame for a supply roll of tape; means for feeding tape from said roll comprising a guide for holding a projecting end portion of said tape at a dispensing station; means normally holding said frame in an upper position; and means operated by said frame as the frame is depressed into a lower position for retracting said guide in a backfeeding direction and severing the tape ahead of the guide.

13. A tape dispenser comprising a base; a frame pivoted to said base for up and down movement; a support on said frame for a supply roll of tape; means for feeding a projecting length of tape drawn from said roll into a dispensing position; means on said frame adapted for manually pressing said frame downwardly while said projecting length of tape is gripped by the hand; means operated by said frame as the same is moved downwardly for retracting said feeding means and severing the gripped tape length from the tape supply ahead of the feeding means; and means urging said frame upwardly for operating said feeding means to project forwardly a length of tape for a successive dispensing operation as the frame is released by the hand.

14. A tape dispenser comprising a base; a frame pivoted to said base for up and down pivotal movement; a support on said frame for a supply roll of pressure-sensitive tape; means for feeding a leading end portion of the tape from said roll into a forwardly projecting position with the adhesive side of the tape facing downwardly; a fingerpiece secured to said frame and overlying said projecting length to enable the projecting length to be gripped against the fingerpiece and the frame to be pressed downwardly in one operation of the hand; means for severing said tape length from the tape supply; means operated by said frame as the same is pressed downwardly for retracting said feeding means and causing the tape to be severed at a distance thereahead; and means urging said frame upwardly for operating said feeding means to feed forwardly a projecting length of tape for a successive dispensing operation as said frame is released by the hand from its downward actuated position.

15. A tape dispenser comprising a support for a supply roll of adhesive tape; a member for backing the non-adhesive side of the tape drawn from said supply roll, said member being mounted for movement transverse to its backing face and being urged into an initial position; a guide for projecting an end portion of the tape into juxtaposition with said backing member so that said end portion of the tape may be gripped against said backing member and held thereto by the hand; tape-severing means; and means operatively coupling said backing member to said guide and severing means; and operated as said backing member is moved from said initial position, for retracting the guide along said backing member and for actuating said severing means to cut the tape ahead of the guide while the guide is in a retracted position.

16. A device for dispensing lengths of pressure-sensitive tape from a supply roll, comprising a movably mounted housing for the tape having an exit opening; a movably mounted tape guide in said housing having a normal position wherein the same projects an end portion of the tape supply through said opening, a member projecting from said housing at one side of said opening for backing the non-adhesive side of the projecting length of tape, said backing member being adapted to be gripped by the hand to hold the projecting length of tape thereto and move said housing in one operation; means urging said housing into an initial position; and means coupled to said housing and operated as the housing is moved from said initial position for retracting said guide in a backfeeding direction from said opening and for severing the tape ahead of the guide while the guide is in a retracted position.

17. A device for dispensing lengths of pressure-sensitive tape from a supply roll, comprising a support for said supply roll; a member projecting from said device for backing the non-adhesive side of the tape drawn from said roll, said backing member being pivotally mounted for movement in directions transverse to its backing face; spring means urging said backing member into an initial position, said backing member having a transverse slot in the inner portion thereof extending throughout the width of the tape; a blade for engaging said slot to cut the tape; means for feeding a leading end portion of the tape in juxtaposition with said backing member; means operated by said backing member as the same is moved from said initial position for actuating said blade to cut the tape; and means operated by said spring means as the backing member is released for return to said initial position for operating said feeding means to feed the end portion of the tape supply in juxtaposition with said backing member.

18. A tape dispenser comprising a base, a frame mounted on said base for up and down movement; spring means urging said frame into an upper terminal position; a support on said frame for a supply roll of pressure-sensitive tape; a guide for the tape drawn from said roll connected to said support, said support and guide being mounted for back and forth reciprocative movement and being urged into a forward terminal position wherein said guide holds a projecting end portion of the tape at a dispensing station; an actuatable member connected to said frame and adapted to be depressed manually while the projecting length of tape is gripped and held at said station by the hand; means for severing the tape at said station; and means operated by said frame as the same is depressed for retracting said guide and support from said station, to cause a length of tape to be pulled from said roll upon the forward end of the tape being held at said station, and for concurrently operating said severing means to cut the tape ahead of said guide while the guide is in a retracted position, said last-stated means being operative to return said support and guide, to feed the end portion of the tape supply to said station for a successive dispensing operation, when upon manual release of said actuatable member said frame is returned to its said upper position by said spring means.

GEORGE H. FRITZINGER.

REFERENCES CITED

The following references are of record in the file of this patent:

UNITED STATES PATENTS

| Number | Name | Date |
|---|---|---|
| 1,377,181 | Biggs | May 10, 1921 |
| 1,409,654 | Biggs | Mar. 14, 1922 |
| 2,192,634 | Blomquist | Mar. 5, 1940 |
| 2,404,317 | Salfisberg | July 16, 1946 |
| 2,452,584 | Luebkeman | Nov. 2, 1948 |